(12) United States Patent
Wang et al.

(10) Patent No.: US 10,062,371 B2
(45) Date of Patent: Aug. 28, 2018

(54) NONWOVEN COMPOSITE

(71) Applicant: Milliken & Company, Spartanburg, SC (US)

(72) Inventors: Yunzhang Wang, Duncan, SC (US); Pradipkumar Bahukudumbi, Greenville, SC (US)

(73) Assignee: Milliken & Company, Spartanburg, SC (US)

(*) Notice: Subject to any disclaimer, the term of this patent is extended or adjusted under 35 U.S.C. 154(b) by 170 days.

(21) Appl. No.: 15/357,437

(22) Filed: Nov. 21, 2016

(65) Prior Publication Data

US 2018/0144734 A1    May 24, 2018

(51) Int. Cl.
*B32B 3/26* (2006.01)
*B32B 5/06* (2006.01)
(Continued)

(52) U.S. Cl.
CPC ............ *G10K 11/168* (2013.01); *B32B 3/266* (2013.01); *B32B 5/022* (2013.01); *B32B 25/10* (2013.01);
(Continued)

(58) Field of Classification Search
CPC .......... B32B 3/26; B32B 3/266; B32B 5/022; B32B 5/06; B32B 5/12; B32B 7/04;
(Continued)

(56) References Cited

U.S. PATENT DOCUMENTS 3,629,047 A * 12/1971 Davison ............... A47G 9/0238
428/110
4,522,876 A *  6/1985 Hiers ........................ B32B 5/06
442/388
(Continued)

FOREIGN PATENT DOCUMENTS

| EP | 1 964 666 | 9/2008 |
|---|---|---|
| WO | WO 2003/031229 | 4/2003 |
| WO | WO 2009/017908 | 2/2009 |

OTHER PUBLICATIONS

Patent Cooperation Treaty PCT International Search Report dated Jan. 5, 2018. International Application No. PCT/US2017/052635. International Filing Date: Sep. 21, 2017.

*Primary Examiner* — Edgardo San Martin
(74) *Attorney, Agent, or Firm* — Cheryl J. Brickey

(57) ABSTRACT

A nonwoven composite containing a first nonwoven layer having a plurality of primary fibers and optionally binder fibers, a thermoplastic film comprising a thermoplastic polymer having an elongation at break greater than 300% and a max softening point (thermomechanical analysis end point) between 150° C. and 200° C. as tested according to ASTM E2347-04 and containing a plurality of holes and an air flow resistance great than 1,500 Rayls. A second nonwoven layer having a plurality of bulking fibers and optionally binder fibers. The thermoplastic film is adjacent the bottom surface of the first nonwoven layer and the top surface of the second nonwoven layer and sandwiched between the first and second nonwoven layers. At least a portion of the primary
(Continued)

fibers from the first nonwoven layer are located in the holes of the thermoplastic film and within the second nonwoven layer.

19 Claims, 6 Drawing Sheets

(51) Int. Cl.
| | |
|---|---|
| *B32B 5/12* | (2006.01) |
| *B32B 7/04* | (2006.01) |
| *B60R 13/08* | (2006.01) |
| *B32B 5/02* | (2006.01) |
| *G10K 11/168* | (2006.01) |
| *B32B 25/10* | (2006.01) |
| *B32B 25/14* | (2006.01) |
| *B32B 7/00* | (2006.01) |

(52) U.S. Cl.
CPC .......... *B32B 25/14* (2013.01); *B60R 13/0815* (2013.01); *B32B 2307/102* (2013.01)

(58) Field of Classification Search
CPC ......... B32B 25/10; B32B 27/12; B60R 13/08; B60R 13/0815; G10K 11/168
See application file for complete search history.

(56) References Cited

U.S. PATENT DOCUMENTS

| | | | |
|---|---|---|---|
| 4,726,976 A * | 2/1988 | Karami | A61F 13/512 428/137 |
| 5,216,790 A | 6/1993 | Eschenback | 28/112 |
| 5,536,556 A * | 7/1996 | Juriga | B29C 43/203 181/284 |
| 5,616,408 A * | 4/1997 | Oleszczuk | B32B 5/26 442/346 |
| 5,892,187 A * | 4/1999 | Patrick | B60R 13/0225 181/286 |
| 6,296,076 B1 * | 10/2001 | Hiers | B60R 13/08 181/286 |
| 6,345,688 B1 * | 2/2002 | Veen | G10K 11/162 181/290 |
| 6,617,002 B2 | 9/2003 | Wood | 428/131 |
| 6,676,199 B2 | 1/2004 | Buisson et al. | 296/193.07 |
| 7,157,137 B2 | 1/2007 | Wenstrup | 428/218 |
| 7,279,214 B2 * | 10/2007 | Nicolai | B60N 3/048 181/284 |
| 7,341,963 B2 | 3/2008 | Wenstrup | 442/415 |
| 7,393,371 B2 | 7/2008 | O'Gary et al. | 51/297 |
| 7,428,803 B2 | 9/2008 | Wenstrup et al. | 52/506.07 |
| 7,491,438 B2 | 2/2009 | Demott et al. | 428/95 |
| 7,521,386 B2 | 4/2009 | Wenstrup et al. | 442/389 |
| 7,563,498 B2 | 7/2009 | Shimizu et al. | 428/95 |
| 7,690,480 B2 | 4/2010 | Mori et al. | 181/290 |
| 7,696,112 B2 | 4/2010 | Wenstrup et al. | 442/415 |
| 7,700,176 B2 | 4/2010 | Allison et al. | 428/95 |
| 7,709,405 B2 | 5/2010 | Wenstrup | 442/415 |
| 7,846,282 B2 | 12/2010 | Nishio et al. | 156/78 |
| 7,928,025 B2 * | 4/2011 | Shipley | D04H 18/02 156/148 |
| 7,998,890 B2 | 8/2011 | Flack | 442/411 |
| 8,091,684 B2 | 1/2012 | Juriga | 181/286 |
| 8,322,487 B1 | 12/2012 | Kitchen et al. | 181/294 |
| 8,418,806 B1 | 4/2013 | Wyerman et al. | 181/290 |
| 8,496,088 B2 | 7/2013 | Kitchen et al. | 181/290 |
| 9,005,733 B2 | 4/2015 | Fereshtehkhou et al. | 428/141 |
| 2006/0240217 A1 * | 10/2006 | Foss | B32B 33/00 428/97 |
| 2007/0269638 A1 * | 11/2007 | Arai | A42B 3/063 428/142 |
| 2011/0165810 A1 * | 7/2011 | Mori | B32B 3/266 442/396 |
| 2016/0333510 A1 * | 11/2016 | Bahukudumbi | D04H 1/4382 |
| 2017/0341272 A1 * | 11/2017 | Vogt | B29B 11/16 |
| 2017/0341273 A1 * | 11/2017 | Vogt | B29B 11/16 |
| 2018/0118981 A1 * | 5/2018 | Durand | C09J 7/21 |

* cited by examiner

FIG. -1-

NONWOVEN COMPOSITE

FIELD OF THE INVENTION

The present invention generally relates to composites having acoustical absorbance properties and methods of making and using such composites.

BACKGROUND

There are a number of products in various industries, including automotive, office and home furnishings, construction, and others; that require materials having a z-direction thickness to provide thermal, sound insulation, aesthetic, and other performance features. In many of these applications it is also required that the material be thermoformable to a specified shape and rigidity. In the automotive industry these products often are used for shielding applications such as noise and thermal barriers in automotive hood liners, firewall barriers, and flooring. These automotive materials may or may not have an aesthetic cover material incorporated into the part, which can also protect the core from abrasion, etc. In home and office furnishing, and construction applications these materials are often used as structural elements to which exterior decorative materials might be added.

There is a need for an acoustic nonwoven composite having improved acoustic properties, lower materials and manufacturing costs.

BRIEF SUMMARY

The present disclosure generally relates a nonwoven composite containing a first nonwoven layer having a plurality of primary fibers and optionally binder fibers, a thermoplastic elastomeric film comprising a thermoplastic elastomeric polymer having an elongation at break greater than 300% and a max softening point (thermomechanical analysis end point) between 150° C. and 200° C. as tested according to ASTM E2347-04, where the thermoplastic elastomeric film comprises a plurality of holes and an air flow resistance great than 1,500 Rayls, and a second nonwoven layer having a plurality of bulking fibers and optionally binder fibers. The thermoplastic elastomeric film is adjacent the bottom surface of the first nonwoven layer and the top surface of the second nonwoven layer and sandwiched between the first and second nonwoven layers. At least a portion of the primary fibers from the first nonwoven layer are located in the holes of the thermoplastic elastomeric film and within the second nonwoven layer.

A process for forming a nonwoven composite begins with a plurality of primary fibers and optionally binder fibers being obtained and then are carded, cross-lapped, and needle-punched to form a first nonwoven layer having a top surface and a bottom surface. The first nonwoven layer is passed over a brush apparatus having a series of projections and interstices between the projections and needling from the bottom surface of the first nonwoven layer into the brush apparatus such that a portion of the primary fibers are pushed into the interstices of the brush apparatus and out of and away from the top surface. Optionally, the bottom surface of the first nonwoven layer is coated with an adhesive.

A plurality of bulking fibers and binder fibers are obtained and then are carded, cross-lapped, and needle-punched to form a second nonwoven layer having a top surface and a bottom surface. The second nonwoven layer is oriented such that the top surface of the second nonwoven layer is facing the bottom surface of the first nonwoven layer.

A thermoplastic elastomeric film is obtained, where the film comprises a thermoplastic elastomeric polymer having an elongation at break greater than 300% and a max softening point (thermomechanical analysis end point) between 150° C. and 200° C. as tested according to ASTM E2347-04.

The thermoplastic elastomeric film is positioned between the first nonwoven layer and the second nonwoven layer such that the thermoplastic elastomeric film is adjacent to the bottom surface of the first nonwoven layer and the top surface of the second nonwoven layer.

The stacked layers are needled from the top surface of the first nonwoven layer with a plurality of needles having an average diameter creating a plurality of holes in the thermoplastic elastomeric layer and moving a portion of the primary fibers from the first nonwoven layer into the second nonwoven layer. The holes in the thermoplastic elastomeric film have a median diameter less than the average diameter of the needles The needled stacked layers are heated to at least partially melt the optional binder fibers in the first nonwoven layer, at least partially melt the binder fibers in the second nonwoven layer, and alter the median size of the holes in the thermoplastic elastomeric film forming the nonwoven composite.

DETAILED DESCRIPTION

The present disclosure is directed to acoustic composites that provide acoustical properties including, but not limited to, sound absorption properties, and sound barrier properties. The acoustic composite (and the acoustically coupled nonwoven composites within the acoustic composite) have exceptional sound absorption properties; (2) have structural features that enable their use in a variety of applications; and (3) can be manufactured in a cost-effective manner.

In practice, roll-goods of a single layer of acoustically-coupled nonwovens can be made in a single process. The roll-goods can be supplied to a die-cutting operation to make individual acoustic parts, such as for installation in an automobile. At the cutting stage two or more layers can be rolled out simultaneously and cut together to form a single acoustic composite consisting of two or more coupled nonwoven composites.

Figure 1:
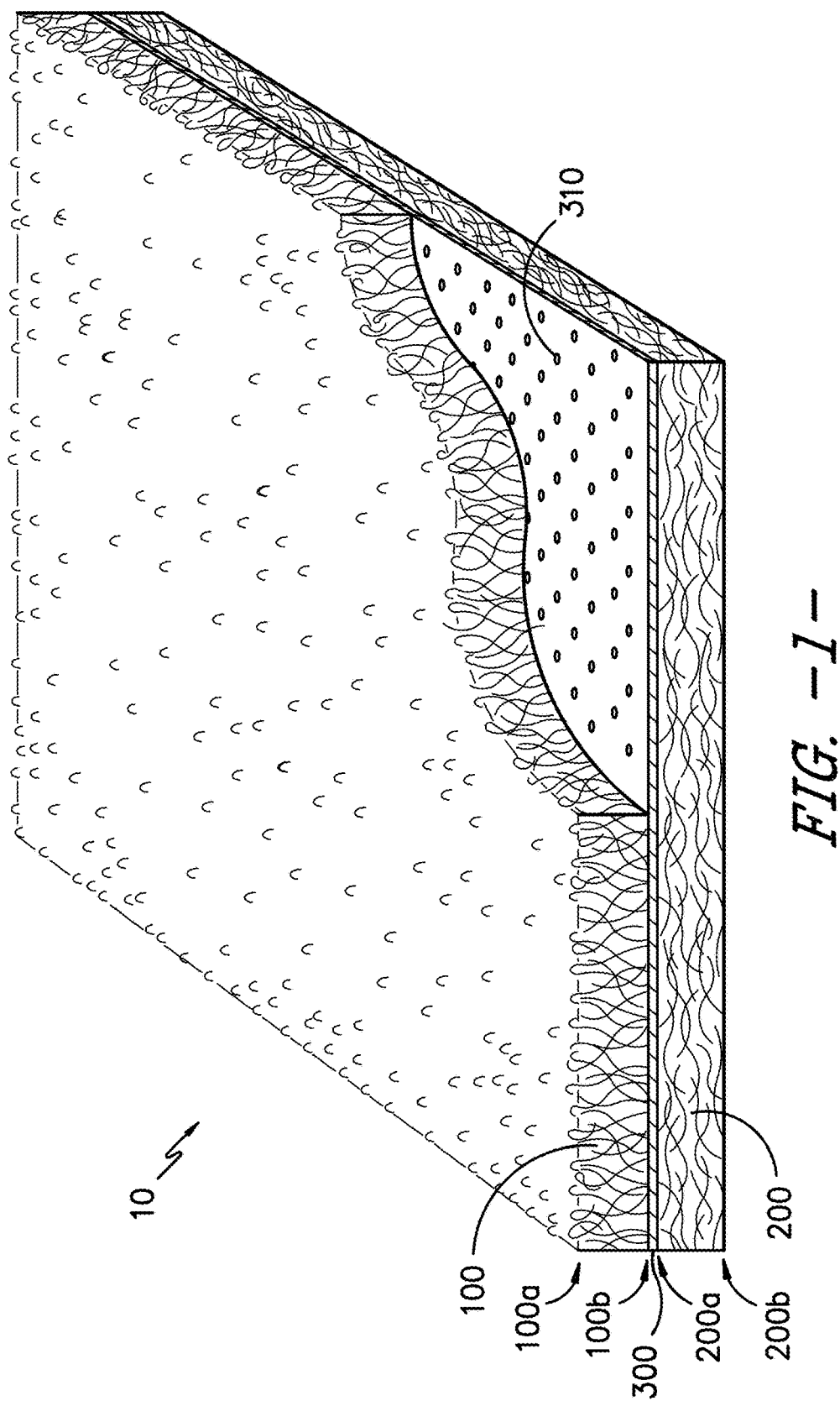
FIGS. 1-2 illustrate schematically cross-sections of embodiments of the acoustic composite.
Figure 2:
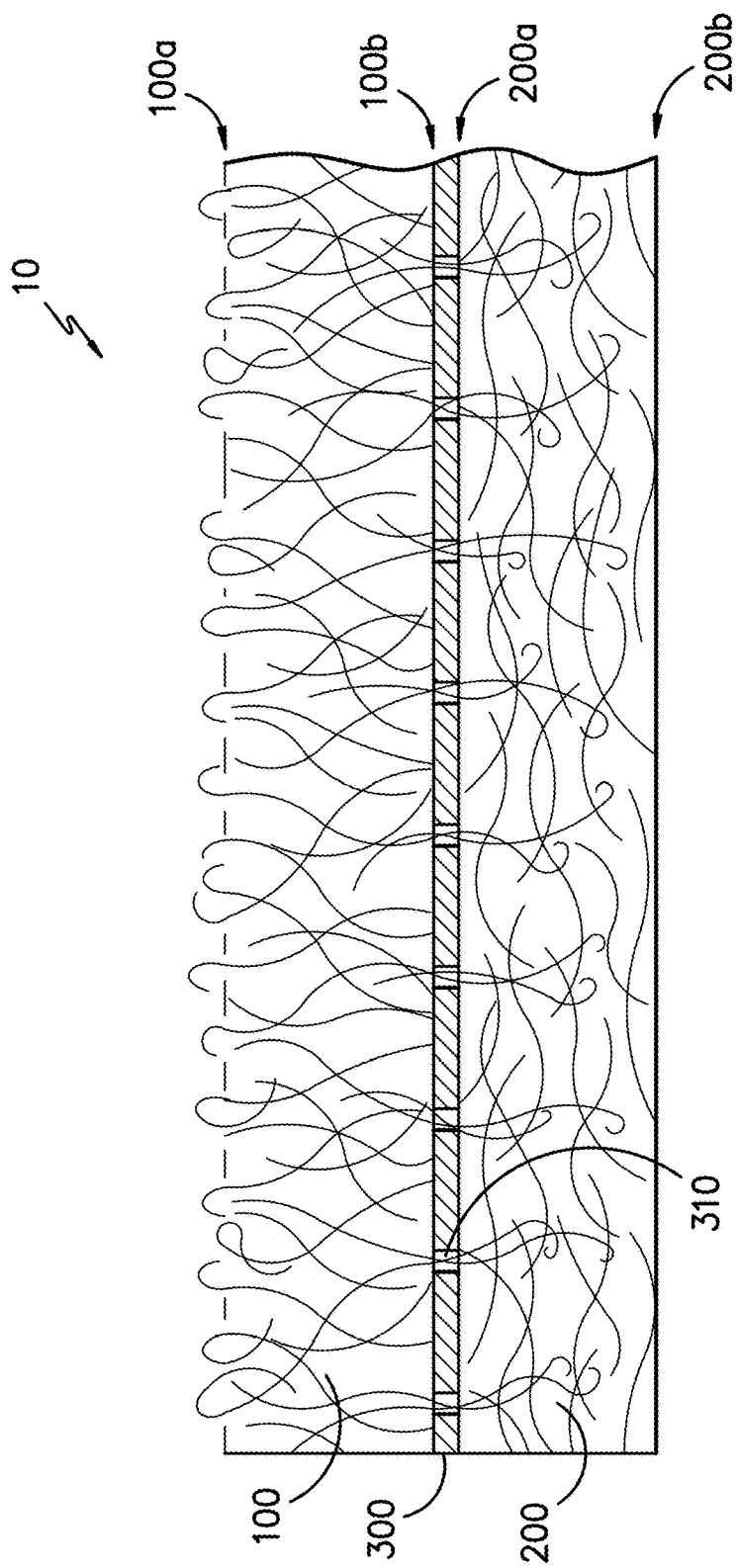

Referring now to FIGS. 1 and 2, there is shown a cut away prospective illustration and a cross-sectional illustration of one embodiment of the invention. The nonwoven composite 10 contains 3 main elements, a first nonwoven layer 100, a second nonwoven layer 200, and a thermoplastic elastomeric film 300 sandwiched between the first nonwoven layer 100 and the second nonwoven layer 200. The first nonwoven layer has a top surface 100*a* and a bottom surface 100*b*. The second nonwoven layer has a top surface 200*a* and a bottom surface 200*b*. The layers are arranged such that the bottom surface 100*b* of the first nonwoven layer 100 and the top surface 200*a* of the second nonwoven layer 200 are adjacent the thermoplastic elastomeric film 300.

The first nonwoven layer 100 is formed carding, cross-lapping, and needle-punching plurality of primary fibers and optional first binder fibers. The first nonwoven layer preferably these characteristics: basis weights in the range of 150-500 gram/m$^2$, thickness in the range of 1 mm-4 mm. In one embodiment, the primary fibers are in an amount of greater than about 75% wt of the first nonwoven layer 100. In another embodiment, the primary fibers are in an amount greater than about 85% of the first nonwoven layer 100. In a preferred embodiment, the primary fibers are between 80-90% by weight of the first nonwoven layer 100.

The primary fibers of the first nonwoven layer 100 are fibers that provide volume in the z-direction, which extends perpendicularly from the planar dimension (of the plane formed by the interface between the first nonwoven layer 100 and the thermoplastic elastomeric film 300). Types of primary fibers would include (but are not limited to) fibers with high denier per filament (3 denier per filament or larger), high crimp fibers, hollow-fill fibers, and the like. These fibers provide mass and volume to the material. Some examples of primary fibers include polyester, polypropylene, and cotton, as well as other low cost fibers. Preferably, the primary fibers have a denier greater than about 6 denier. In another embodiment, the primary fibers have a denier greater than about 10 denier. The primary fibers are preferably staple fibers. In one embodiment, the primary fibers do not a circular cross section, but are fibers having a higher surface area, including but not limited to, segmented pie, 4 DG, winged fibers, tri-lobal etc. It has been shown that the fiber cross-section has an effect on the sound absorption properties of the nonwoven. In a preferred embodiment, the primary fibers comprise polyester. Polyester fibers can be manufactured from post-consumer bottles and post-industrial wastes and are generally less expensive than polypropylene or nylon staple fibers. In addition, color matched polyester fibers do not typically suffer from gas fading issues, an inherent problem with some polypropylene fibers.

The optional first binder fibers of the first nonwoven layer 100 are fibers that form an adhesion or bond with the other fibers. First binder fibers can include fibers that are heat activated. Examples of heat activated binder fibers are fibers that can melt at lower temperatures, such as low melt fibers, bi-component fibers, such as side-by-side or core and sheath fibers with a lower sheath melting temperature, and the like. In one embodiment, the first binder fibers are a polyester core and sheath fiber with a lower melt temperature sheath. A benefit of using a heat activated binder fiber as the first binder fiber in the first nonwoven layer 100, is that the layer can be subsequently molded to part shapes for use in automotive hood liners, engine compartment covers, ceiling tiles, office panels, etc. The binder fibers are preferably staple fibers. Preferably, when the nonwoven composite 10 is consolidated and then cooled, the first binder fibers remain as discernable fibers. In another embodiment, when the nonwoven composite 10 is consolidated, the binder fibers lose their fiber shape and form a coating on surrounding materials.

Preferably, the first binder fibers 40 have a denier less than or about equal to 15 denier, more preferably less than about 6 denier. An additional benefit of using a heat activated binder fiber as the first binder fiber is that the nonwoven composite 10 may be subsequently molded to part shapes for use in automotive hood liners, engine compartment covers, etc. In one embodiment, at least some of the first binder fibers are nano-fibers (their diameter is less than one micrometer).

In one embodiment, the first nonwoven layer is formed into a random velour. To create the random velour, the first nonwoven layer is passed over a brush apparatus having a series of projections and interstices between the projections. The first nonwoven layer is then needled from the bottom surface of the first nonwoven layer into the brush apparatus such that a portion of the primary fibers are pushed into the interstices of the brush apparatus and out of and away from the top surface. This creates a loop-like and velour-like surface on the first surface of the first nonwoven layer. This random velour look is desirable as an A layer surface (the surface of a composite that the consumer will interact with and touch) for end uses such as car interiors. Preferably, the random velour has a pile height of at least about 2 millimeters.

There may be an adhesive on the bottom surface 100*b* of the first nonwoven layer 100 (that would be between the first nonwoven layer 100 and the thermoplastic elastomeric film 300). The optional adhesive layer may be any suitable adhesive, including but not limited to a water-based adhesive, a solvent-based adhesive, and a heat or UV activated adhesive. The adhesive may be applied as a free standing film, a coating (continuous or discontinuous, random or patterned), a powder, or any other known means.

The second nonwoven layer 200 is formed carding, cross-lapping, and needle-punching plurality of bulking fibers and second binder fibers. The second nonwoven layer preferably these characteristics: basis weights in the range of 300-700 gram/m$^2$, thickness in the range of 3 mm-7 mm. In one embodiment, the primary fibers are in an amount of greater than about 60% wt of the first nonwoven layer 200. In another embodiment, the primary fibers are in an amount greater than about 70% of the first nonwoven layer 200. In a preferred embodiment, the primary fibers are between 60-75% by weight of the first nonwoven layer 200.

The bulking fibers of the second nonwoven layer 200 are fibers that provide volume in the z-direction, which extends perpendicularly from the planar dimension (of the plane formed by the interface between the second nonwoven layer 200 and the thermoplastic elastomeric film 300). Types of bulking fibers would include (but are not limited to) fibers with high denier per filament (3 denier per filament or larger), high crimp fibers, hollow-fill fibers, and the like. These fibers provide mass and volume to the material. Some examples of primary fibers include polyester, polypropylene, and cotton, as well as other low cost fibers. Preferably, the bulking fibers have a denier greater than about 6 denier. In another embodiment, the bulking fibers have a denier greater than about 10 denier. The bulking fibers are preferably staple fibers. In one embodiment, the bulking fibers do not a circular cross section, but are fibers having a higher surface area, including but not limited to, segmented pie, 4 DG, winged fibers, tri-lobal etc. It has been shown that the fiber cross-section has an effect on the sound absorption properties of the nonwoven. It has also been shown that increasing the surface area of the nonwoven layer 200 by using smaller denier fibers (<3 denier) enhances the sound absorption properties of the composite. The bulking fibers may the same as the primary fibers or different.

The second binder fibers of the second nonwoven layer 200 are fibers that form an adhesion or bond with the other fibers and may be selected from the description of the optional first binder fibers above. In one embodiment, the first binder fibers are the same as the second binder fibers.

In another embodiment, the first binder fibers are different than the second binder fibers (in at least one of the following: staple length, melt temperature, materials, denier).

There may be an adhesive on the top surface 200a of the second nonwoven layer 200 (that would be between the second nonwoven layer 200 and the thermoplastic elastomeric film 300). The optional adhesive layer may be any suitable adhesive, including but not limited to a water-based adhesive, a solvent-based adhesive, and a heat or UV activated adhesive. The adhesive may be applied as a free standing film, a coating (continuous or discontinuous, random or patterned), a powder, or any other known means.

Any other suitable fiber may also be used in the first nonwoven layer 100 and/or the second nonwoven layer 200 in addition to the fibers described previously. These may include, but are not limited to an additional binder fiber having a different denier, staple length, composition, or melting point or a second bulking fiber having a different denier, staple length, or composition, and a fire resistant or fire retardant fiber. The fiber may also be an effect fiber, providing benefit a desired aesthetic or function. These effect fibers may be used to impart color, chemical resistance (such as polyphenylene sulfide fibers and polytetrafluoroethylene fibers), moisture resistance (such as polytetrafluoroethylene fibers and topically treated polymer fibers), or others.

In one embodiment, the nonwoven layer(s) 100 and/or 200 contain fire resistant fibers. These fire resistant fibers may also act as the bulking fibers or may be sued in addition to the bulking fibers. As used herein, fire retardant fibers shall mean fibers having a Limiting Oxygen Index (LOI) value of 20.95 or greater, as determined by ISO 4589-1. Types of fire retardant fibers include, but are not limited to, fire suppressant fibers and combustion resistant fibers. Fire suppressant fibers are fibers that meet the LOI by consuming in a manner that tends to suppress the heat source. In one method of suppressing a fire, the fire suppressant fiber emits a gaseous product during consumption, such as a halogenated gas. Examples of fiber suppressant fibers include modacrylic, PVC, fibers with a halogenated topical treatment, and the like. Combustion resistant fibers are fibers that meet the LOI by resisting consumption when exposed to heat. Examples of combustion resistant fibers include silica impregnated rayon such as rayon sold under the mark VISIL®, partially oxidized polyacrylonitrile, polyaramid, para-aramid, carbon, meta-aramid, melamine and the like.

The fibers (primary, bulking, and binding) may additionally contain additives. Suitable additives include, but are not limited to, fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, silica, glass, clay, talc, pigments, colorants, glass beads or bubbles, antioxidants, optical brighteners, antimicrobial agents, surfactants, fire retardants, and fluoropolymers. One or more of the above-described additives may be used to reduce the weight and/or cost of the resulting fiber and layer, adjust viscosity, or modify the thermal properties of the fiber or confer a range of physical properties derived from the physical property activity of the additive including electrical, optical, density-related, liquid barrier or adhesive tack related properties.

Referring back to FIG. 1, there nonwoven composite 10 contains a thermoplastic elastomeric film 300. The thermoplastic elastomeric film may be any suitable thermoplastic elastomeric film that contains a thermoplastic elastomeric polymer. Preferably, the thermoplastic elastomeric polymer has an ultimate elongation at break of great than 300% and a max softening point (thermomechanical analysis end point) between 150 and 200° C. as tested according to ASTM E2347-04. In a more preferred embodiment, the thermoplastic elastomeric polymer has a maximum softening point between 160 and 190° C. as tested according to ASTM E2347-04. Another key characteristic of the thermoplastic elastomeric film used in the preferred embodiment is that the dimensional stability/shrinkage at the maximum softening point is less than 1%. Also, thermoplastic elastomeric films with the properties described above typically have a tear resistance as measured by ASTM D1004 of greater than 300 lb/inch. As example, commonly used polyethylene, polypropylene, polyamide or polyester films do not satisfy all the criteria described above.

In one embodiment, the thermoplastic elastomeric film comprises aromatic polyether polyurethane. In another embodiment, the thermoplastic elastomeric film comprises polyester polyurethane. Examples of preferred films are Duroflex and Platilon family of thermoplastic polyurethane films available from Covestro Inc. Similar films are also available from American Polyfilm Inc. In one embodiment, Duroflex PT9400, a polyether polyurethane film, is used as the thermoplastic elastomeric film. This film has a maximum softening point of 170 C, with ultimate elongation of 575% and a tear resistance of 500 lb/inch. In another embodiment, Duroflex PS7000, a polyester polyurethane film, is used as the thermoplastic elastomeric film. This film has a maximum softening point of 174 C, with ultimate elongation of 650% and a tear resistance of 600 lb/inch. In yet another embodiment, Duroflex PS8000, a polyester polyurethane film, is used as the thermoplastic elastomeric film. This film has a maximum softening point of 163° C., with ultimate elongation of 500% and a tear resistance of 600 lb/inch.

The thermoplastic elastomeric film 300 is positioned between the first nonwoven layer 100 and the second nonwoven layer 200 such that the film 300 is adjacent to the bottom surface 100b of the first nonwoven layer 100 and the top surface 200a of the second nonwoven layer 200.

The layers (100, 200, 300) of the nonwoven composite are then needled together. The needling occurs from the top surface 100a of the first nonwoven layer 100 using a plurality of needles having an average diameter. The needles pierce the thermoplastic elastomeric film and push a portion of the primary fibers from the first nonwoven layer 100 into the holes in the thermoplastic elastomeric film 300 and the second nonwoven layer 200. The holes in the thermoplastic elastomeric film have a median diameter less than the average diameter of the needles. "Average diameter" is defined to be the average diameter of the part of the felting needle that pierces the film. This is defined by the gage of the felting needle used in the composite process.

When the needle penetrates the thermoplastic elastomeric film and retracts, the hole generated by the needle becomes much smaller due to the high elongation and the tear resistance of the thermoplastic elastomeric polymer. The resulting hole size is typically comparable or smaller than the thickness (gauge) of the film. In contrast, needle holes in commonly available films like polyolefins, polyesters or polyamides will become comparable or larger due to poor elasticity, low elongation and poor tear resistance. The resulting hole size is typically larger than the thickness (gauge) of the film.

After the layers are needled together, the needled nonwoven is heated at least partially melting the optional binder fibers in the first nonwoven layer, at least partially melting the binder fibers in the second nonwoven layer, and altering the median size of the holes in the thermoplastic elastomeric film forming the nonwoven composite.

In a preferred embodiment, the step of heating the needled stacked layers alters the median size of the holes in the thermoplastic elastomeric film forming the nonwoven composite to become smaller or remain unchanged if the heating temperature is no greater than the maximum softening temperature by 5° C. If the heating temperature exceeds the maximum softening temperature of the thermoplastic film by over 5° C., the size of the needle hole may become larger. In contrast, the median size of the holes in thermoplastic film made using polyolefins, polyester or polyamides typically stay the same or get larger after the heating step irrespective of the heating temperature.

In one embodiment, after the step of heating the needled stacked layers the thermoplastic elastomeric film has an air flow resistance great than 1,500 Rayls. The air flow resistance (AFR) within the entire nonwoven composite is typically dominated by the air flow resistance of the thermoplastic elastomeric film. The air flow resistance is measured using ISO standard 9053:1991. The AFR of the layer can be tuned depending on the sound absorption and transmission loss targets. Preferred range for AFR is between 1500-4000 Rayls, more preferably 2500-4000 Rayls.

In one embodiment, there is an additional thermoplastic layer extruded on the bottom surface 200b of the second nonwoven layer 200 of the nonwoven composite 10. In another embodiment, there is an already formed additional thermoplastic layer that is attached to the bottom surface 200b of the second nonwoven layer 200 by any known means (for example, adhesive or binder fibers). Preferably, the additional thermoplastic layer is not porous. Being not porous means that the AFR of the thermoplastic layer is greater than 10000 Rayls.

In one embodiment, a sound absorbing nonwoven layer is attached to the additional thermoplastic layer. This sound absorbing nonwoven layer has a thickness greater than the thickness of the second nonwoven layer 200. This sound absorbing nonwoven layer is sometimes referred to in the auto industry as the shoddy layer. The shoddy layer is an air-laid nonwoven and typically comprises a blend of recycled cotton, polyester and bi-component fibers. Increasing the percent of recycled cotton in the shoddy layer increases the surface area of the nonwoven layer and hence the sound absorption performance. On one embodiment, the sound absorbing nonwoven layer is attached directly to the second nonwoven layer 200 (without an additional thermoplastic film between the two layers.

The nonwoven composite 10 may also contain any additional layers for physical or aesthetic purposes. Suitable additional layers include, but are not limited to, a nonwoven fabric, a woven fabric, a knitted fabric, a foam layer, a film, a paper layer, an adhesive-backed layer, a foil, a mesh, an elastic fabric (i.e., any of the above-described woven, knitted or nonwoven fabrics having elastic properties), an apertured web, an adhesive-backed layer, or any combination thereof. Other suitable additional layers include, but are not limited to, a color-containing layer (e.g., a print layer); one or more additional sub-micron fiber layers having a distinct average fiber diameter and/or physical composition; one or more secondary fine fiber layers for additional insulation performance (such as a melt-blown web or a fiberglass fabric); foams; layers of particles; foil layers; films; decorative fabric layers; membranes (i.e., films with controlled permeability, such as dialysis membranes, reverse osmosis membranes, etc.); netting; mesh; wiring and tubing networks (i.e., layers of wires for conveying electricity or groups of tubes/pipes for conveying various fluids, such as wiring networks for heating blankets, and tubing networks for coolant flow through cooling blankets); or a combination thereof. The additional layers may be on either or both sides of the nonwoven composite. For example, a textile may be applied to one side of the nonwoven composite using an optional adhesive layer to form an aesthetic surface for an end use such as certain automobile applications.

The nonwoven composite 10 may further comprise one or more attachment devices to enable the composite 10 to be attached to a substrate or other surface. In addition to adhesives, other attachment devices may be used such as mechanical fasteners like screws, nails, clips, staples, stitching, thread, hook and loop materials, etc.

The one or more attachment devices may be used to attach the composite 10 to a variety of substrates. Exemplary substrates include, but are not limited to, a vehicle component; an interior of a vehicle (i.e., the passenger compartment, the motor compartment, the trunk, etc.); a wall of a building (i.e., interior wall surface or exterior wall surface); a ceiling of a building (i.e., interior ceiling surface or exterior ceiling surface); a building material for forming a wall or ceiling of a building (e.g., a ceiling tile, wood component, gypsum board, etc.); a room partition; a metal sheet; a glass substrate; a door; a window; a machinery component; an appliance component (i.e., interior appliance surface or exterior appliance surface); a surface of a pipe or hose; a computer or electronic component; a sound recording or reproduction device; a housing or case for an appliance, computer, etc. The nonwoven composite may be molded in additional operation to be formed into a nonplanar three-dimensional shape which would be useful for applications such as car panels.

Example 1

A non-woven fiber based composite floor was formed having a first nonwoven layer and a second nonwoven layer. The first nonwoven was formed from a blend of two fibers and was made using a random velour machine and had a basis weight of 350 gram/m$^2$:

1) 50% by weight of a 6 denier black polyester (PET) fiber.

2) 40% by weight of a 10 denier black PET fiber.

3) 10% by weight of a 4 denier (4.4 decitex) low melt binder fiber. The fiber is a core-sheath polyester fiber with a lower melting temperature sheath.

The second non-woven was formed from a blend of two fibers and had a basis weight of 500 gram/m$^2$ made using a standard carded and cross-lapped needle punch machine.

1) 90% by weight of a 6 denier polyester staple fiber.

2) 10% by weight of a 4 denier (4.4 decitex) low melt binder fiber. The fiber is a core-sheath polyester fiber with a lower melting temperature sheath.

The non-woven layers were produced using a standard industrial scale needle punch carpet production line with 38 gauge twisted needles. The average diameter of the needles was 0.55 mm. Staple fibers as indicated above were mixed and formed in a mat using carding and cross-lapping. The mat was pre-needled using plain barbed needles to form the non-woven layers.

Figure 3:
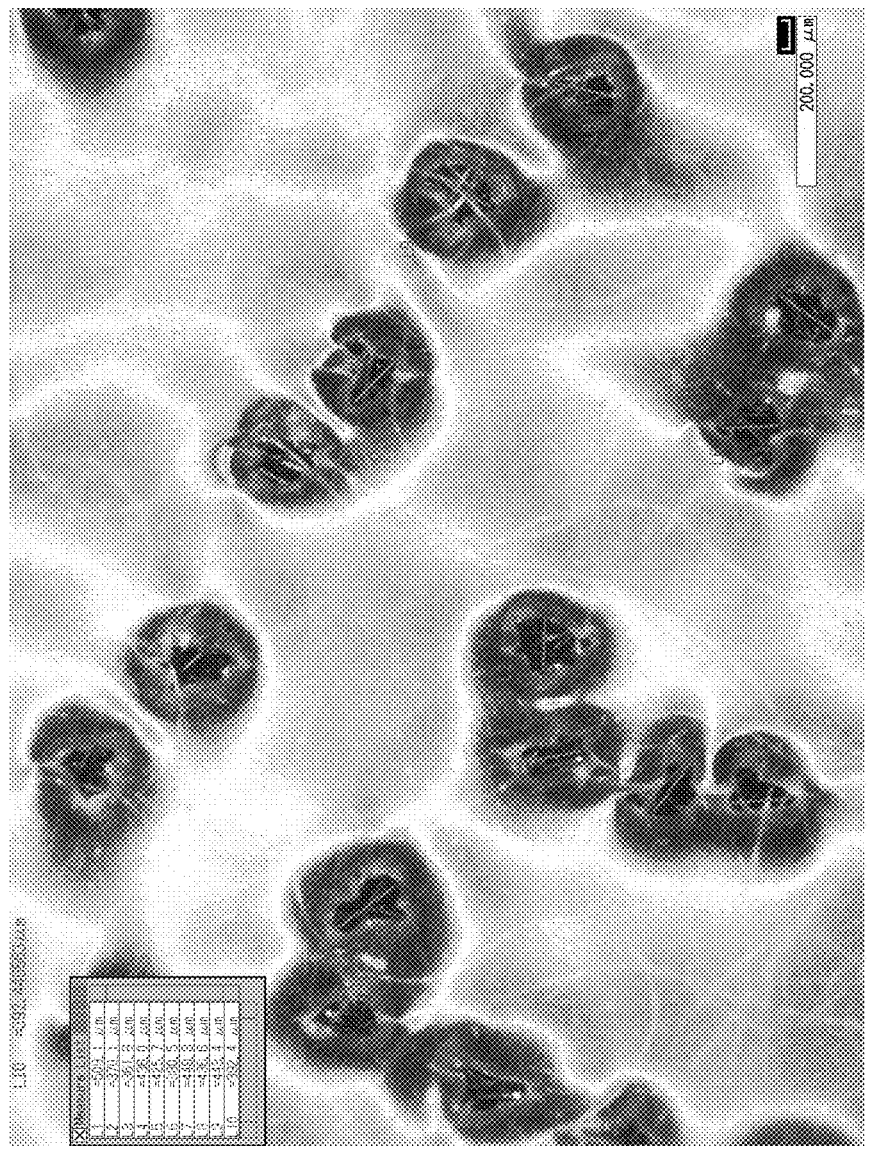
FIG. 3 is a photograph of the PE film of Example 1 before heating.
Figure 4:
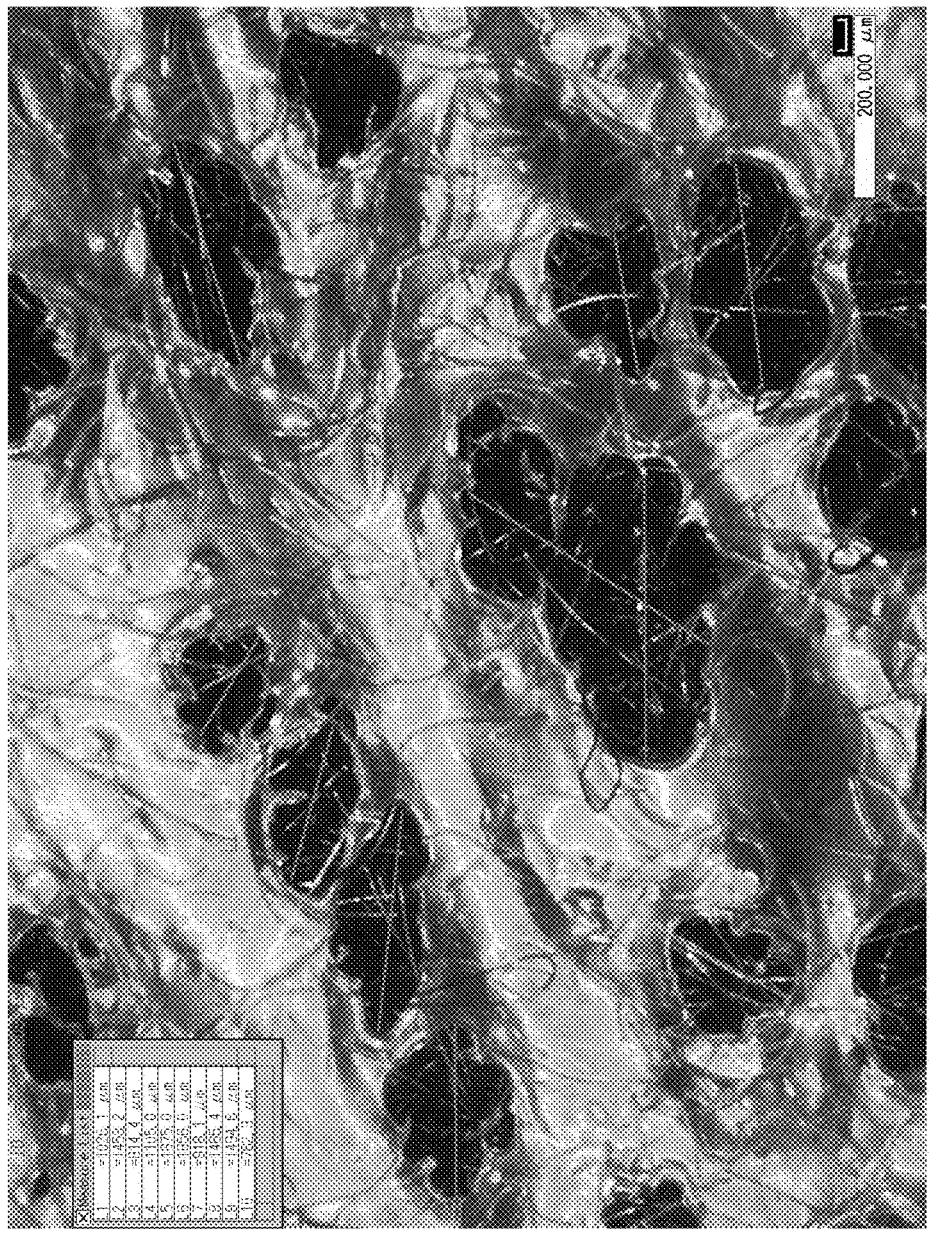
FIG. 4 is a photograph of the PE film of Example 1 after heating.

A 20 micron polyethylene (PE) film was positioned between the first non-woven layer and the second nonwoven layer and then needled together using a needle-loom from the first nonwoven side of the non-woven. The needling pushed fibers from the first nonwoven layer through the film and into the second nonwoven layer. After needling, essentially no fibers from the second nonwoven layer were in the first nonwoven layer. A photograph of the holes in the PE film are shown in FIG. 3. The nonwoven composite was then heat-set using a pin tenter convection heat oven set at 175° C. to melt the low-melt fibers and bond the first and second nonwoven layers. The process of needling and heat-setting creates large holes in the solid PE film making that layer very air permeable. This is shown in FIG. 4. The consolidated non-woven composite had a thickness of 6 mm. The PE film is not elastomeric although it has an elongation at break of 300%. The maximum softening point of the PE film is approximately 115 C. The areal density of the holes was approximately 250 holes per square inch. The average diameter of the holes before heating was approximately 420 microns. The average diameter of the holes after heating was enlarged to approximately 1300 microns. The AFR of the composite before heating was 595 Rayls, which dropped to 130 Rayls after heating.

Example 2

In example 2, a non-woven fiber based composite floor was formed having a first nonwoven layer and a second nonwoven layer. The first nonwoven layer was formed from a blend of two fibers and was made using a random velour machine and had a basis weight of 350 gram/m²:
1) 50% by weight of a 6 denier black PET fiber.
2) 40% by weight of a 10 denier black PET fiber.
3) 10% by weight of a 4 denier (4.4 decitex) low melt binder fiber. The fiber is a core-sheath polyester fiber with a lower melting temperature sheath.

The second non-woven layer was formed from a blend of two fibers and had a basis weight of 300 gram/m²:
1) 60% by weight of a 6 denier polyester staple fiber.
2) 40% by weight of a 4 denier (4.4 decitex) low melt binder fiber. The fiber is a core-sheath polyester fiber with a lower melting temperature sheath.

The thermoplastic elastomeric film used between the first nonwoven layer and the second nonwoven layer was a 4 mil thick aromatic polyether polyurethane film (available as DUREFLEX™ PT9400 film). The DUREFLEX™ PT9400 film has an elongation at break of 575% and a max softening point of 170° C.

The first and second non-woven layers were produced using a standard industrial scale needle punch carpet production line with 40 gauge twisted needles. The average diameter of the needles is 0.50 mm. Staple fibers as indicated above were mixed and formed in a mat using carding and cross-lapping. The mat was pre-needled using plain barbed needles to form the non-woven layers. The thermoplastic elastomeric film has placed between the first and second nonwoven layers and then all of the layers were needled together using a needle-loom from the first nonwoven layer side of the non-woven.

Figure 5:
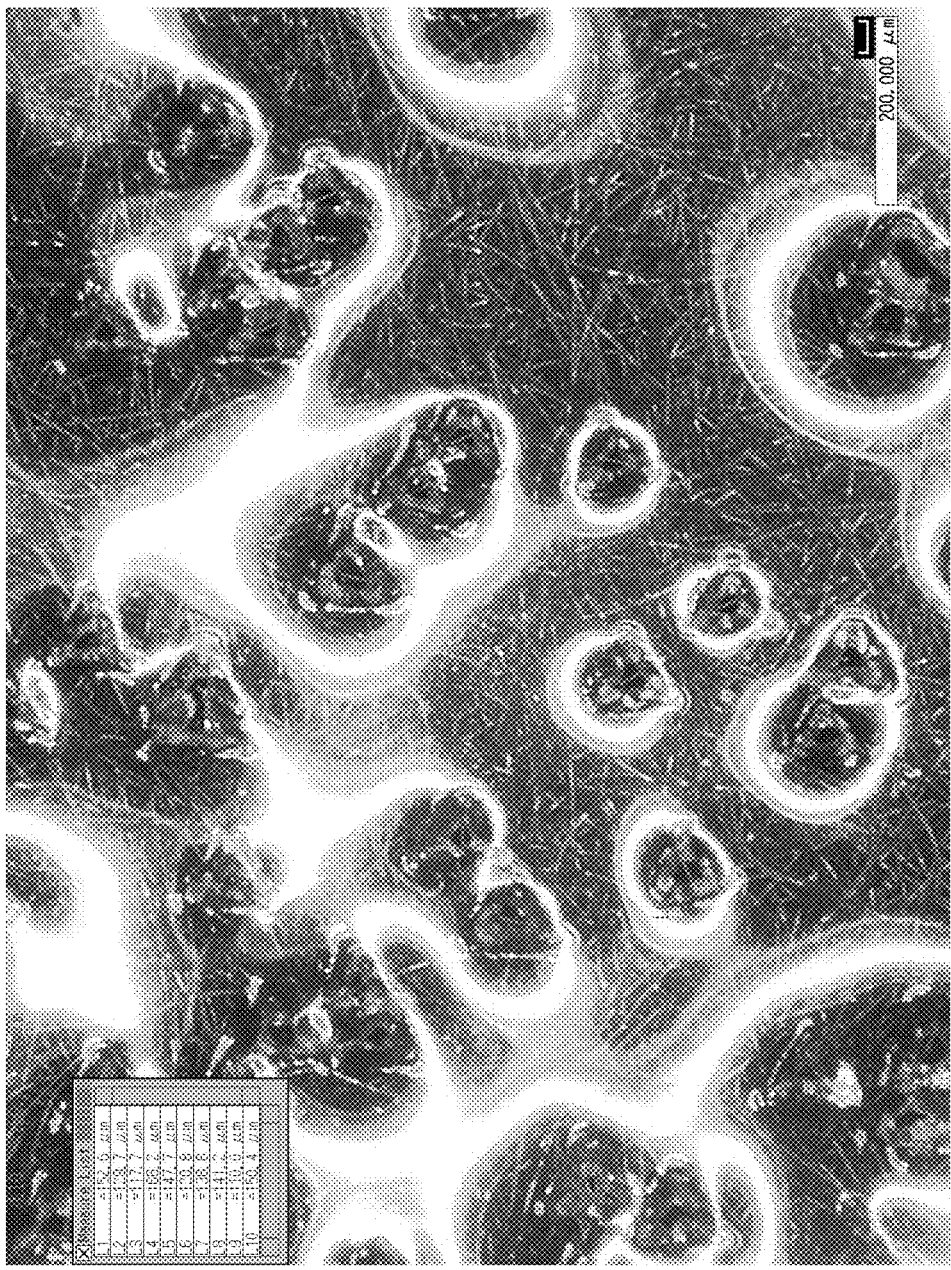
FIG. 5 is a photograph of the DUREFLEX™ film of Example 2 before heating.
Figure 6:
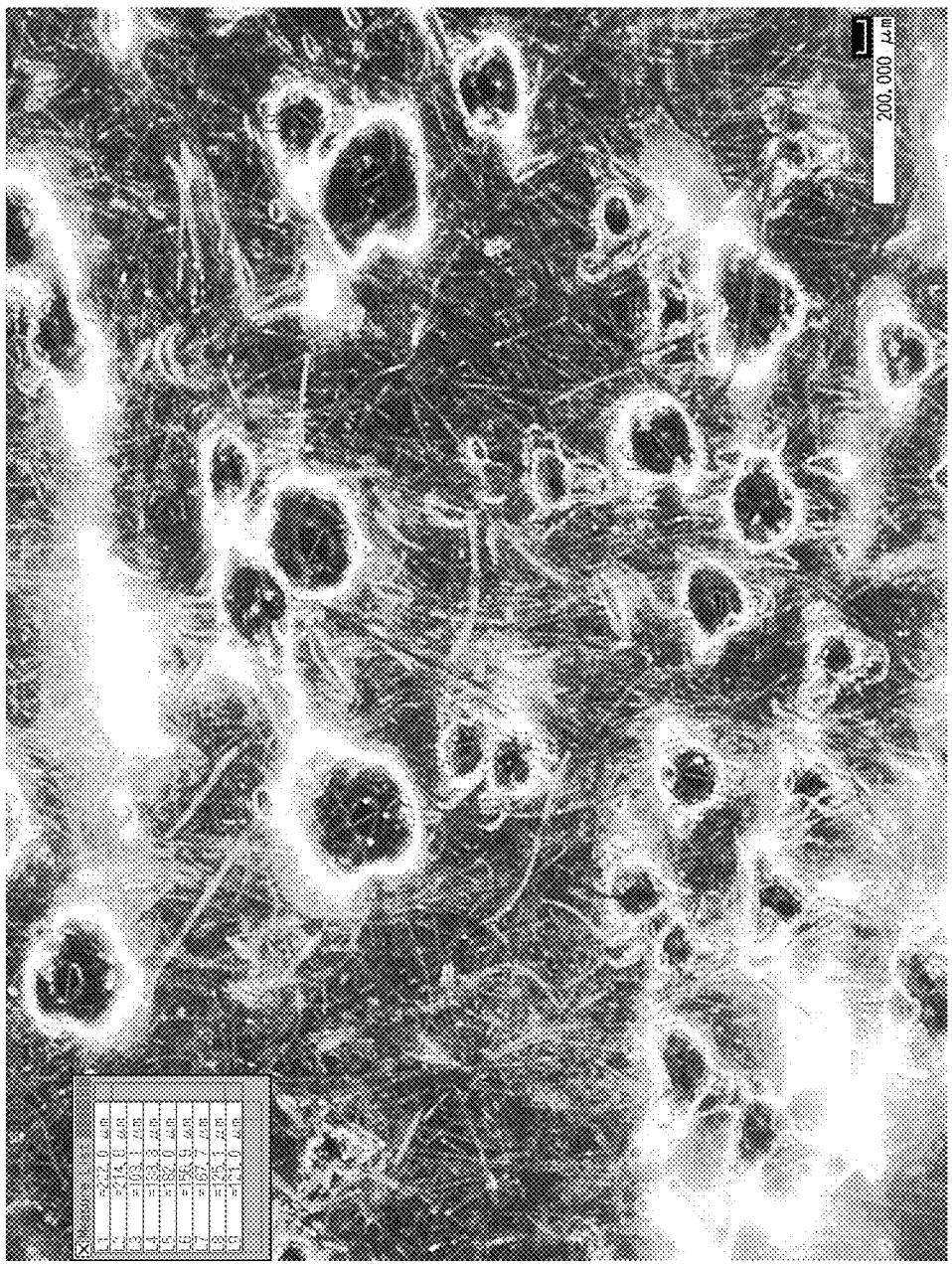
FIG. 6 is a photograph of the DUREFLEX™ film of Example 2 before heating.

The needling pushed fibers from the first nonwoven layer through the film and into the second nonwoven layer. After needling, essentially no fibers from the second nonwoven layer were in the first nonwoven layer. A photograph of the holes in the DUREFLEX™ film are shown in FIG. 5. The non-woven composite was then heat-set using a pin tenter convection heat oven set at 175° C. to melt the low-melt fibers and bond the first and second nonwoven layers. The Duraflex film had very high elongation and was very puncture resistant. As a result, the process of needling and heat-setting created very small holes, resulting in an AFR greater than 1500 Rayls as shown in FIG. 6. The areal density of the holes was approximately 500 holes per square inch. The average diameter of the holes before heating was approximately 140 microns. The average diameter of the holes after heating was enlarged slightly to approximately 160 microns. The consolidated non-woven composite had a thickness of 6 mm. The AFR of the composite before heating was 1500 Rayls. The AFR of the composite was increased slightly to 1510 Rayls after heating.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:
1. A nonwoven composite comprising:
a first nonwoven layer having an upper surface and a bottom surface, wherein the first nonwoven layer comprises a plurality of primary fibers and optionally binder fibers;
a thermoplastic elastomeric film comprising a thermoplastic elastomeric polymer obtaining a thermoplastic elastomeric film, wherein the film comprises a puncture resistant thermoplastic elastomeric polymer having an elongation at break greater than 300% and a max softening point (thermomechanical analysis end point) between 150° C. and 200° C. as tested according to ASTM E2347-04, wherein the thermoplastic elastomeric film comprises a plurality of holes and an air flow resistance great than 1,500 Rayls;

a second nonwoven layer having an upper surface and a bottom surface, wherein the second nonwoven layer comprises a plurality of bulking fibers and optionally binder fibers;

wherein the thermoplastic elastomeric film is adjacent the bottom surface of the first nonwoven layer and the top surface of the second nonwoven layer, and wherein at least a portion of the primary fibers from the first nonwoven layer are located in the holes of the thermoplastic elastomeric film and within the second nonwoven layer.

2. The nonwoven composite of claim 1, further comprising an extruded thermoplastic layer on the bottom surface of the second nonwoven layer of the nonwoven composite.

3. The nonwoven composite of claim 2, wherein the extruded thermoplastic layer is not porous.

4. The nonwoven composite of claim 2, further comprising a sound absorbing nonwoven layer on the extruded thermoplastic layer, wherein the thickness of the sound absorbing nonwoven layer is greater than the thickness of the second nonwoven layer.

5. The nonwoven composite of claim 1, wherein the primary fibers comprise polyester.

6. The nonwoven composite of claim 1, wherein the first nonwoven layer is a random velour.

7. The nonwoven composite of claim 1, wherein the random velour has a pile height of at least about 2 mm.

8. The nonwoven composite of claim 1, wherein the thermoplastic elastomeric film comprises aromatic polyether polyurethane.

9. The nonwoven composite of claim 1, wherein the thermoplastic elastomeric film comprises polyester polyurethane.

10. The nonwoven composite of claim 1, wherein the thermoplastic elastomeric film has a max softening point (thermomechanical analysis end point) between 160° C. and 190° C. as tested according to ASTM E2347-04.

11. The nonwoven composite of claim 1, wherein the primary fibers are in an amount of greater than about 60% wt of the first nonwoven layer.

12. The nonwoven composite of claim 1, wherein thermoplastic elastomeric film has an air flow resistance of between 1500-4000 Rayls.

13. The nonwoven composite of claim 1, wherein essentially no fibers from the second nonwoven layer are located in the first nonwoven layer.

14. A car comprising the nonwoven composite of claim 1.

15. The car of claim 14, further comprising an extruded thermoplastic layer on the bottom surface of the second nonwoven layer of the nonwoven composite.

16. The car of claim 15, further comprising a sound absorbing nonwoven layer on the extruded thermoplastic layer, wherein the thickness of the sound absorbing nonwoven layer is greater than the thickness of the second nonwoven layer.

17. The car of claim 14, wherein the first nonwoven layer is a random velour.

18. The car of claim 14, wherein the thermoplastic elastomeric film comprises aromatic polyether polyurethane.

19. The car of claim 14, wherein the thermoplastic elastomeric film comprises polyester polyurethane.

* * * * *